US009170430B2

(12) United States Patent
Tanaka

(10) Patent No.: US 9,170,430 B2
(45) Date of Patent: Oct. 27, 2015

(54) ANTI-VIBRATION ACTUATOR, LENS UNIT AND CAMERA FURNISHED THEREWITH, AND MANUFACTURING METHOD FOR SAME

(71) Applicant: TAMRON CO., LTD, Saitama-shi, Saitama (JP)

(72) Inventor: Yukio Tanaka, Saitama (JP)

(73) Assignee: TAMRON CO., LTD, Saitama-shi, Saitama (JP)

( * ) Notice: Subject to any disclaimer, the term of this patent is extended or adjusted under 35 U.S.C. 154(b) by 0 days.

(21) Appl. No.: 14/451,113

(22) Filed: Aug. 4, 2014

(65) Prior Publication Data

US 2014/0338175 A1    Nov. 20, 2014

Related U.S. Application Data

(62) Division of application No. 13/723,351, filed on Dec. 21, 2012, now abandoned.

(30) Foreign Application Priority Data

Dec. 27, 2011  (JP) ................. 2011-284758

(51) Int. Cl.
  G03B 17/00   (2006.01)
  G02B 27/64   (2006.01)
  G03B 5/00    (2006.01)
  H04N 5/232   (2006.01)
  H02K 41/035  (2006.01)
(52) U.S. Cl.
  CPC ............... *G02B 27/646* (2013.01); *G03B 5/00* (2013.01); *H02K 41/0356* (2013.01); *H04N 5/2328* (2013.01); *H04N 5/23258* (2013.01); *G03B 2205/0015* (2013.01); *Y10T 29/49826* (2015.01)
(58) Field of Classification Search
  USPC .......................................................... 396/55
  See application file for complete search history.

(56) References Cited

U.S. PATENT DOCUMENTS 5,973,319 A    10/1999  Washisu
6,046,768 A     4/2000  Kaneda et al.

(Continued)

FOREIGN PATENT DOCUMENTS

JP    10-260445 A     9/1998
JP    2003-233098 A   8/2003

(Continued)

*Primary Examiner* — Minh Phan
(74) *Attorney, Agent, or Firm* — Westerman, Hattori, Daniels & Adrian, LLP

(57) ABSTRACT

To provide an anti-vibration actuator capable of smooth transition to image-blur prevention control. The present invention is an actuator (10) furnished with a locking mechanism, including: a fixed portion (12); a movable portion (14) with an image-blur prevention lens (16); a movable portion support means (18); a drive means for driving the movable portion; a movable portion locking mechanism (42) for locking a movable portion by limiting the range over which the movable portion can move to be within a predetermined locked movable range; a memory section (36a), within which is stored the movable portion initial position to which the movable portion is moved upon startup of image-blur prevention control; and a control section (36) for moving the movable portion to the initial position and releasing the lock upon startup of control; whereby the predetermined position in the locked movable range is stored as an initial position.

3 Claims, 11 Drawing Sheets

(56) References Cited

U.S. PATENT DOCUMENTS 6,718,131 B2 4/2004 Okazaki et al.
7,123,290 B2 * 10/2006 Ohishi ........................ 348/208.4
7,755,666 B2 7/2010 Noji

FOREIGN PATENT DOCUMENTS

| JP | 2005-148230 A | 6/2005 |
| JP | 2010-054812 A | 3/2010 |

* cited by examiner

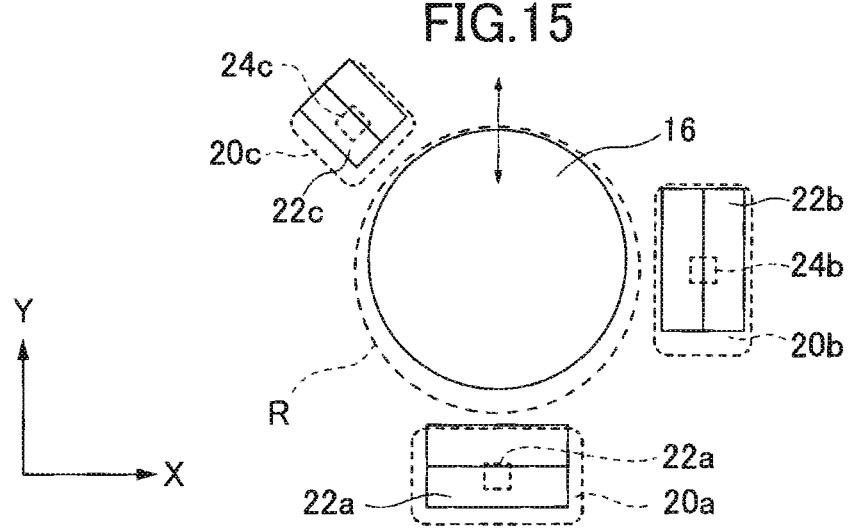
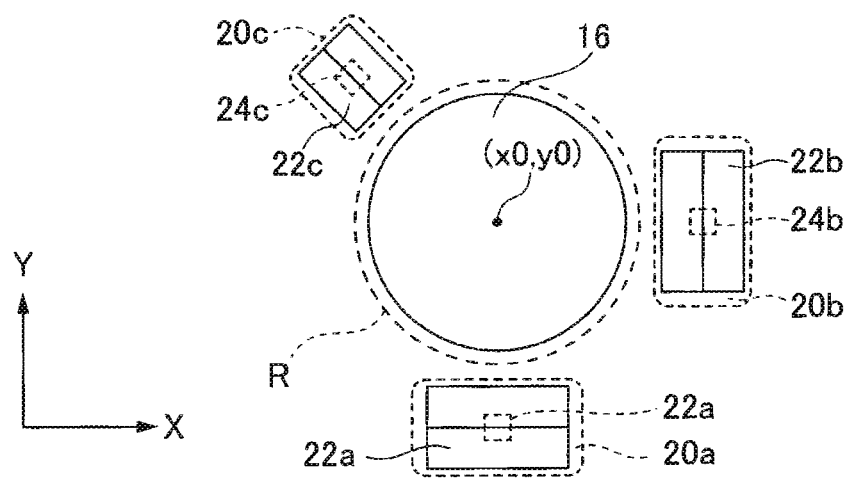

ANTI-VIBRATION ACTUATOR, LENS UNIT
AND CAMERA FURNISHED THEREWITH,
AND MANUFACTURING METHOD FOR
SAME

CROSS-REFERENCE TO RELATED
APPLICATIONS

The present patent application is a divisional of U.S. application Ser. No. 13/723,351, filed Dec. 21, 2012, which claims priority from Japanese Patent Application No. 2011-284758 filed on Dec. 27, 2011, which are incorporated herein by reference in their entireties.

BACKGROUND OF THE INVENTION

1. Field of the Invention

The present invention pertains to an anti-vibration actuator, and more particularly to an anti-vibration actuator furnished with a locking mechanism for executing anti-vibration control by moving an image-blur prevention lens, a lens unit and camera furnished therewith, and a manufacturing method for same.

2. Description of Related Art

A "Vibration Compensation Device" is set forth in Published Unexamined Patent Application H.10-260445 (Patent Document 1). This vibration compensation device is furnished with an affixing means (locking mechanism) for locking an image-blur prevention lens to prevent image blurring. In this vibration compensation device, an affixing means is engaged with a lens frame for an image-blur prevention lens when under non-image-blur prevention control in which vibration compensation is not carried out, thereby locking the image-blur prevention lens in a predetermined position. The affixing means is a ring-shaped member disposed to surround the lens frame of the image-blur prevention lens which is rotated when locking the lens frame, and the lens frame is mechanically locked when the inner circumferential surface of the affixing means engages projections provided on the lens frame.

Here, even if the lens frame is in a mechanically locked state, some looseness ("play"), which is unavoidable with a mechanical lock, is required, and in general the movable portion of a lens frame or the like is able to move on the order of several 10s of microns even in a locked state. In general, however, the position of the image-blur prevention lens is controlled with a resolution of approximately several microns during image-blur prevention control, and movement of the lens frame caused by "looseness" in the locked state greatly affects the quality of captured images. Therefore in an image-blur compensation device (anti-vibration actuator) it is necessary to minimize as much as possible the amount of movement caused by "looseness" in the movable portions such as the of the lens frame, etc. in the locked state.

On the other hand, in anti-vibration actuators having a locking mechanism, in general a drive force is first activated on the movable portion such as the lens frame or the like and the movable portion is held to a predetermined initial position when image-blur prevention control is started, and thereafter locking of the movable portion by the locking mechanism is released. I.e., when locking of the movable portion is released prior to activating a drive force on the movable portion and holding a position, the movable portion drops due to gravity, the image-blur prevention lens is significantly moved, and the image formed in the finder is greatly distorted. Therefore in an anti-vibration actuator drive force is generally applied to the movable portion and the lock released immediately after holding the movable portion at the initial position.

PRIOR ART REFERENCES

Patent Documents

Patent Document 1
Published Unexamined Patent Application H.10-260445

BRIEF SUMMARY OF THE INVENTION

Problems the Invention Seeks to Resolve

However, the present inventors discovered the new problem that if the "looseness" of the movable portion is reduced when locked, the image formed in the finder may be greatly distorted when transitioning from a non-image-blur prevention control state to image-blur prevention control. I.e., a control is exercised upon initialization of image-blur prevention control whereby a drive force acts on the movable portion with the movable portion locked by the locking mechanism, and the movable portion is moved to a predetermined initial position. Here, when the initial position to which the movable portion is moved is within the range of movement of the movable portion in the locked state (within the "looseness" in the locked state), the movable portion can be moved in normal fashion to the initial position and a smooth transition to image-blur prevention control effected.

However, when the initial position goes outside the movable range of the movable portion in the locked state, the movable portion is still unable to reach the initial position even after the movable portion is moved to a position at which it mechanically contacts the locking mechanism, and the control force for moving to the initial position continues to act on the movable portion. Therefore in this state the movable portion is held in a state whereby it is pressed against the contact portion of the locking mechanism by the control force. When the lock is released with the movable portion pressed against the contact portion of the locking mechanism, the locking mechanism contact portion suddenly separates from the movable portion, and the movable portion is moved significantly, traveling past the initial position. I.e., release of locking by the locking mechanism results in a large overshoot relative to the target initial position by the movable portion to which the control force had been applied to cause it to reach the initial position. Therefore upon startup of image-blur prevention control, the image formed in the finder is greatly distorted.

This type of problem is particularly prone to occur in cases where the "looseness" of the movable portion in the locked state is designed to be small in order to improve image quality under non-image-blur prevention control. In other words, the movable range of the movable portion in the locked state is affected by various mechanical dimensional accuracies and the like. On the other hand, control of the initial position to which the movable portion is moved is performed electrically, and positioning accuracy of the initial position is affected by variabilities in position sensors, amplifiers, etc. used for control. Therefore when movable portion "looseness" in the locked position is designed to be small, it is difficult to reliably place an initial position determined by control within the movable range of the movable portion in a locked state. The present invention was undertaken in order to solve these newly arising technical issues.

The present invention thus has the object of providing an anti-vibration actuator, a lens unit and camera furnished therewith, and a manufacturing method for same capable of smooth transition to image-blur prevention control even when "looseness" is designed to be small in the locked state.

Means for Resolving the Problem

In order the resolve the above-described problems, the present invention is an anti-vibration actuator furnished with a locking mechanism for executing image-blur prevention control by moving an image-blur prevention lens, including: a fixed portion; a movable portion attached to the image-blur prevention lens; a movable portion support means for supporting the movable portion so that it is movable relative to the fixed portion; a drive means for activating a drive force between the fixed portion and the movable portion to drive the movable portion relative to the fixed portion; a movable portion locking mechanism which does not interfere with the movable portion when under image-blur prevention control, and mechanically locks the movable portion by limiting the range over which the movable portion can move to a predetermined locked movable range when not under image-blur prevention control; a memory section in which is stored the movable portion initial position to which the movable portion is moved at the start of image-blur prevention control; and a control portion for controlling the drive means at startup of image-blur prevention control to move the movable portion to the movable portion initial position and release the lock by the movable portion locking mechanism; wherein the memory section stores, as a movable portion initial position, the predetermined position of the movable portion in the locked movable range, determined by prior adjustment.

In the present invention thus constituted, the movable portion to which the image stabilizing lens is attached is movably supported relative to the affixed portion by a movable portion support means. The drive means applies drive force between the fixed portion and the movable portion to drive the movable portion relative to the fixed portion. The movable portion locking mechanism does not interfere with the movable portion during image blur prevention control, and during non-image-blur prevention control the movable portion is mechanically locked by limiting the range within which the movable portion can move to a predetermined movable range when locked. The control portion controls the drive means at the start of image-blur prevention control, moving the movable portion to a movable portion initial position stored in the memory section and releasing the lock imposed by the movable portion locking mechanism. The movable portion initial position stored in the memory section is determined by pre-adjustment as a predetermined position within the movable range when locked.

In the present invention thus constituted, at the time of startup of image-blur prevention control the movable portion is moved to a movable portion initial position within a locked movable range determined in advance by carrying out adjustments. Therefore at the time of image-blur prevention control startup, control of the movable portion aimed to the initial position as the target position at which the movable portion cannot be reached in the locked state, can be prevented and associated problems are avoided. Thus according to the present invention, a smooth transition to image-blur prevention control can be achieved even when "looseness" has been designed to be small in the locked state.

In the present invention the movable portion locking mechanism preferably has multiple contact portions for limiting the range in which the movable portion is able to move within the locked movable range by contacting the movable portion, and the movable portion initial position is determined to be the position at which there is no contact between the movable portion and each contact portion.

In the present invention thus constituted, the movable portion initial position is determined as the position at which there is no contact between the movable portion and each of the contact portions, therefore no force is mutually imparted between the movable portion moved to the movable portion initial position and contact portions in the locked state, and large movements of the movable portion caused by control forces when the locked state is released can be prevented.

The present invention is also a lens unit having a lens barrel, an image capturing lens disposed inside this lens barrel, and the anti-vibration actuator of the present invention.

Furthermore, the present invention is a camera having a camera main body and the lens unit of the present invention attached to this camera body.

The present invention is a method for manufacturing a lens unit furnished with an anti-vibration actuator for executing image-blur prevention control, including steps of: disposing an image capturing lens and an anti-vibration actuator inside a lens barrel; placing an anti-vibration actuator movable portion locking mechanism in a locked state; and adjusting the anti-vibration actuator; the step of adjusting has steps of: driving the movable portion of the anti-vibration actuator in a first direction in the locked state and measuring the range over which the movable portion can travel in the first direction; driving the anti-vibration actuator movable portion in a second direction different from the first direction in the locked state and measuring the range over which the movable portion can travel in the second direction; and determining an initial position of the movable portion when the anti-vibration actuator starts image-blur prevention control within a movable range in the first direction and within a movable range in the second direction, and storing same in the memory section.

In the present invention thus constituted, the image capturing lens and the anti-vibration actuator are disposed inside the lens barrel and the lens unit is assembled. Next, the anti-vibration actuator movable portion locking mechanism is placed in a locked state, wherein adjustment of the anti-vibration actuator is performed. In the adjustment of the anti-vibration actuator, the movable portion is first driven in the first direction and a measurement made of the range over which the movable portion can move in the first direction; next the movable portion is driven in a second direction different from the first direction, and a measurement is made of the movable range in the second direction. Furthermore, the movable portion initial position is determined within the movable range in the first direction and within the movable range in the second direction, and this movable portion initial position is stored in the memory section.

In the present invention thus constituted, the movable portion initial position is determined within a movable range in the first and second directions, therefore the movable portion initial position will not be set to a position at which the movable portion cannot be moved in the locked state. Therefore at the time of image-blur prevention control startup, a position at which the movable portion cannot be moved in the locked state is adopted as the target position, so that control of the movable portion can be prevented and associated problems avoided. Thus the present invention enables the manufacture of a lens unit capable of smooth transition to image-blur prevention control even when "looseness" has been designed to be small in the locked state. Also, in the present invention thus constituted, the movable range when locked of the movable portion, which is affected by the dimensional accuracy of various parts in the movable portion locking mechanism, positioning accuracy, and the like, can be measured with the lens unit assembled, thus enabling the movable portion initial position to be accurately determined.

In the present invention, preferably, the step of adjusting further has a step for moving the anti-vibration actuator movable portion to approximately the center of the movable range in the first direction after the step of driving in the first direction; the second direction is selected approximately perpendicular to the first direction; and in the step of determining the movable portion initial position is determined to be approximately at the center of the movable range in the first direction and approximately at the center of the movable range in the second direction.

In the present invention thus constituted, the movable portion initial position is determined to be approximately in the center of the movable range in the first and second directions, therefore the movable portion initial position can be set to the position at which it is most difficult for the movable portion to contact the movable portion locking mechanism. Thus even when the locked movable range changes due to the passage of years, etc., contact between the movable portion and the movable portion locking mechanism can be reliably prevented.

In the present invention, the step of adjusting is carried out with the movable portion controlled to be able to move only translationally.

In the present invention thus constituted, rotation of the movable portion is regulated in the adjustment stage, therefore when measuring the locked movable range, the movable portion is in contact with the movable portion locking mechanism at a constant attitude, and the movable range when locked can be accurately measured.

The present invention is a method for manufacturing an anti-vibration actuator furnished with a locking mechanism for executing image-blur prevention control by moving an image-blur prevention lens, including steps of: assembling a fixed portion, a movable portion to which an image-blur prevention lens is attached, and a movable portion locking mechanism for locking the movable portion; placing the movable portion locking mechanism in a locked state; driving the movable portion in a locked state in a first direction and measuring the movable portion movable range in the first direction; driving the movable portion in a locked state in a second direction different from the first direction and measuring the movable portion movable range in the second direction; and determining an initial position of the movable portion when the anti-vibration actuator starts image-blur prevention control to be within a movable range in the first direction and a movable range in the second direction, and storing same in a memory section.

Effect of the Invention

According to the anti-vibration actuator and lens unit and camera furnished therewith and manufacturing method for same, a smooth transition to image-blur prevention control can be achieved even when "looseness" has been designed to be small in the locked state.

BRIEF DESCRIPTION OF THE DRAWINGS

FIG. 15 is a diagram explaining a procedure for adjusting a lens unit in a first embodiment of the present invention.

FIG. 16 is a diagram explaining a procedure for adjusting a lens unit in a first embodiment of the present invention.

DETAILED DESCRIPTION OF THE INVENTION

Figure 1:
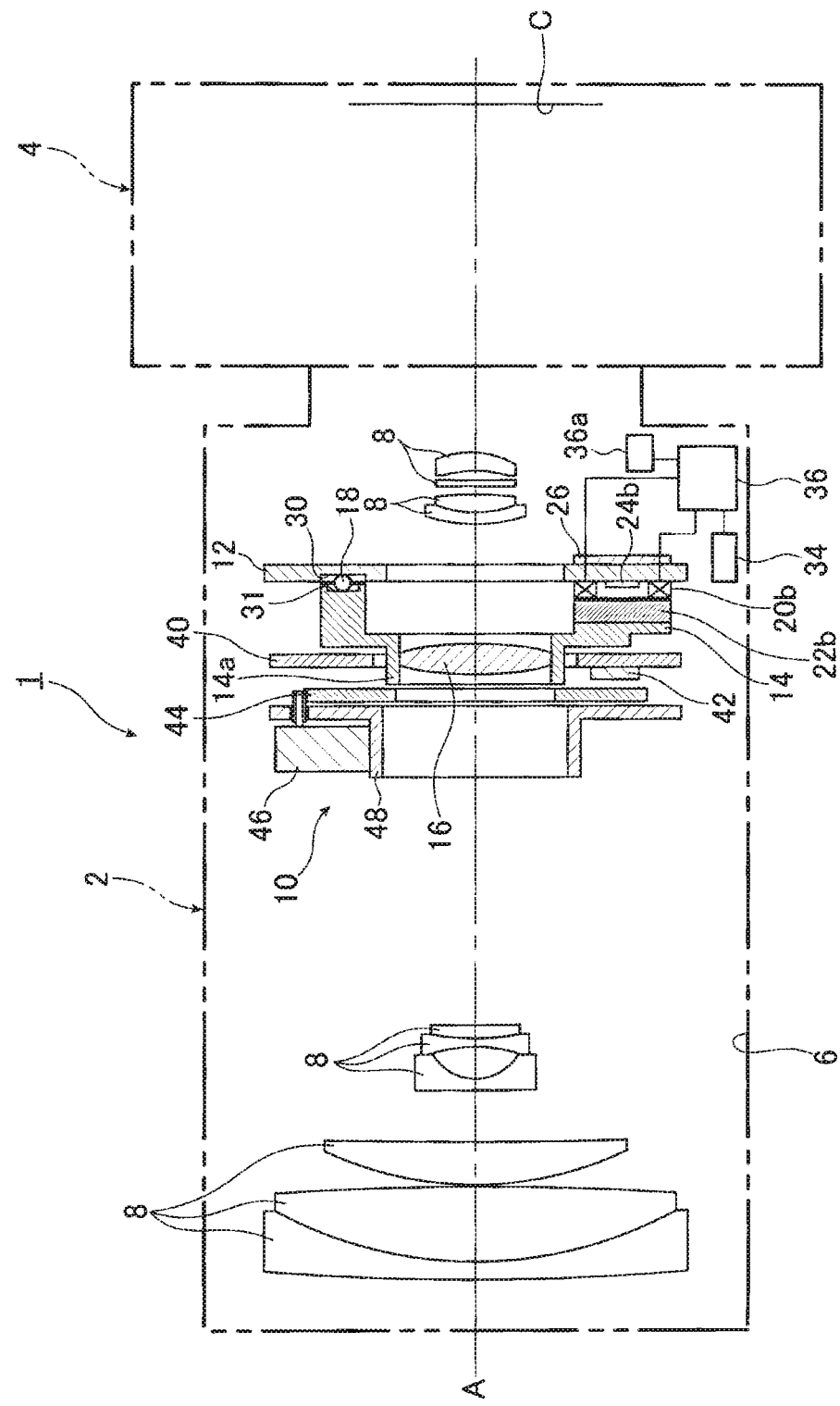
FIG. 1 is a sectional diagram of a camera according to a first embodiment of the present invention.

Next, referring to the attached figures, we discuss embodiments of the present invention. First, referring to FIGS. 1 through 7, we discuss a camera according to a first embodiment of the present invention. FIG. 1 is a sectional diagram of a camera according to a first embodiment of the present invention.

As shown in FIG. 1, the camera 1 of this embodiment has a lens unit 2 and a camera body 4. The lens unit 2 has a lens barrel 6, multiple imaging lenses 8 disposed within this lens barrel, an anti-vibration actuator 10 for moving image stabilizing lens 16 within a predetermined plane, and a gyro 34 serving as vibration detection means for detecting vibration of the lens barrel 6.

In camera 1 of the first embodiment of the present invention, vibration is detected by gyro 34, anti-vibration actuator 10 is operated based on the detected vibration to move the image-blur prevention lens 16, and the image focused on image capture element C in the camera body 4 is stabilized. In the present embodiment, a piezo-electric gyro is used as the gyro 34. Note that in the present embodiment the image stabilizing lens is constituted as a single lens, but the lens for stabilizing images may also be a group of multiple lenses. In the present Specification, "image stabilizing lens" includes single lenses and lens sets for stabilizing images.

Lens unit 2 is attached to the camera body 4 so as to focus incident light on the image capture element C.

The approximately cylindrical lens barrel 6 holds within it multiple image capturing lenses 8, and focus can be adjusted by moving a portion of the image capturing lenses 8.

Figure 2:
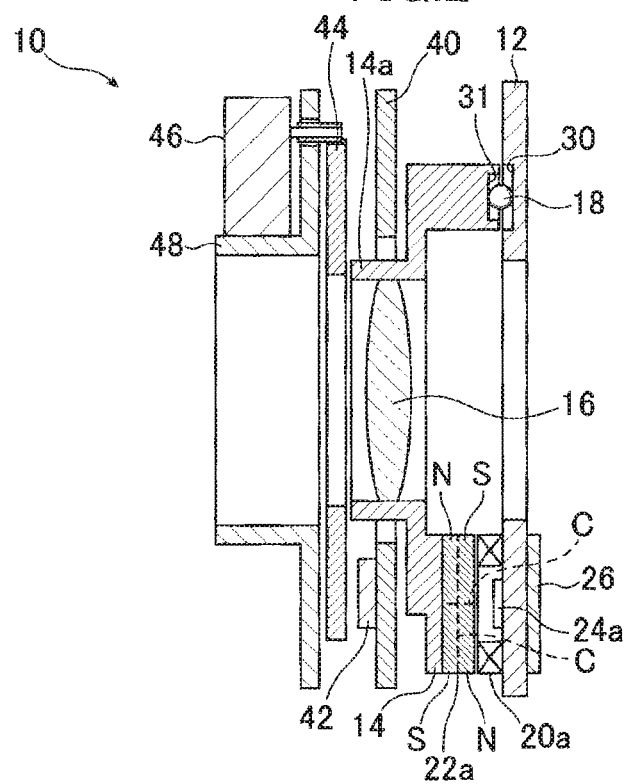
FIG. 2 is a side elevation sectional diagram of an anti-vibration actuator furnished with a camera according to a first embodiment of the present invention.
Figure 3:
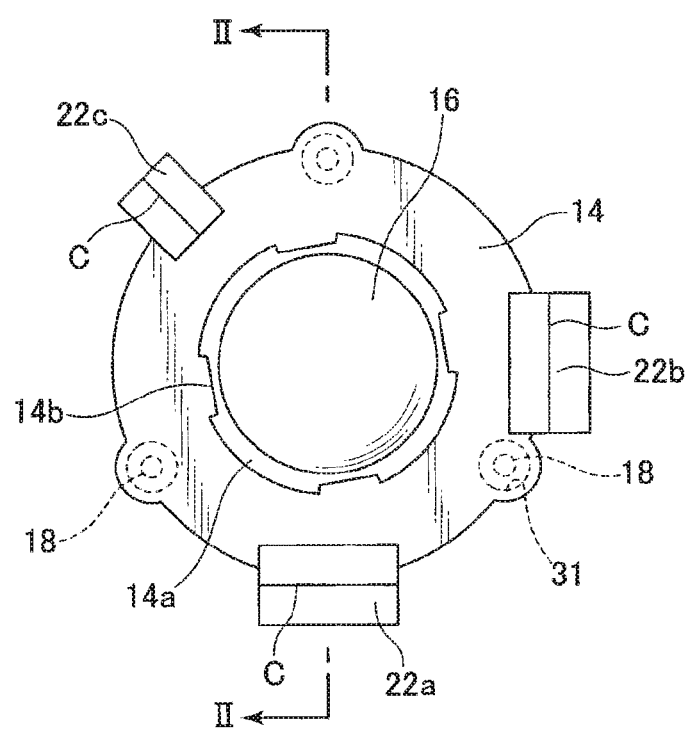
FIG. 3 is a front elevation showing the movable portion of the anti-vibration actuator.
Figure 4:
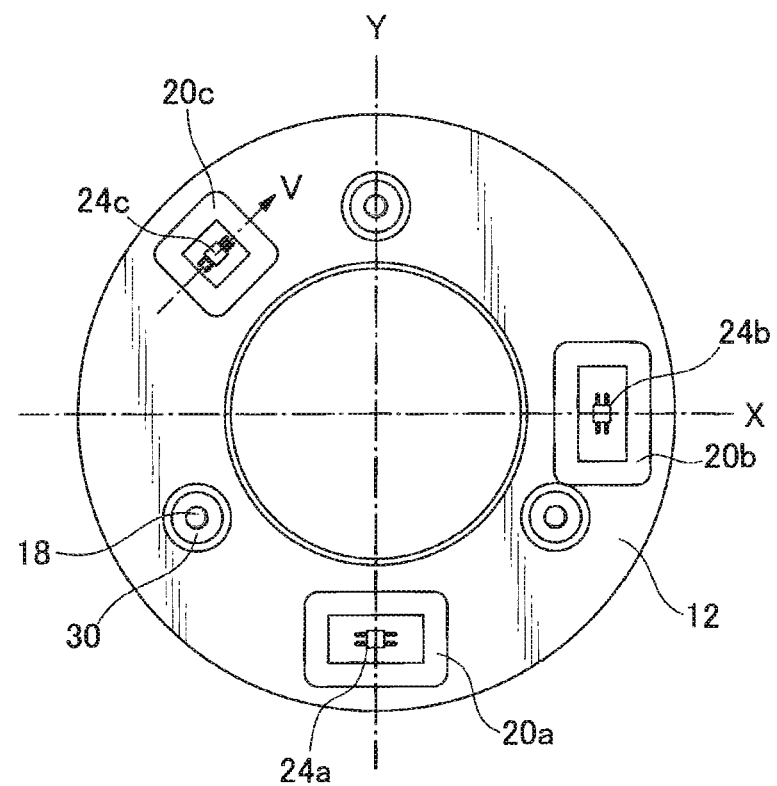
FIG. 4 is a front elevation diagram showing an affixing portion with the movable portion of the anti-vibration actuator removed.
Figure 5:
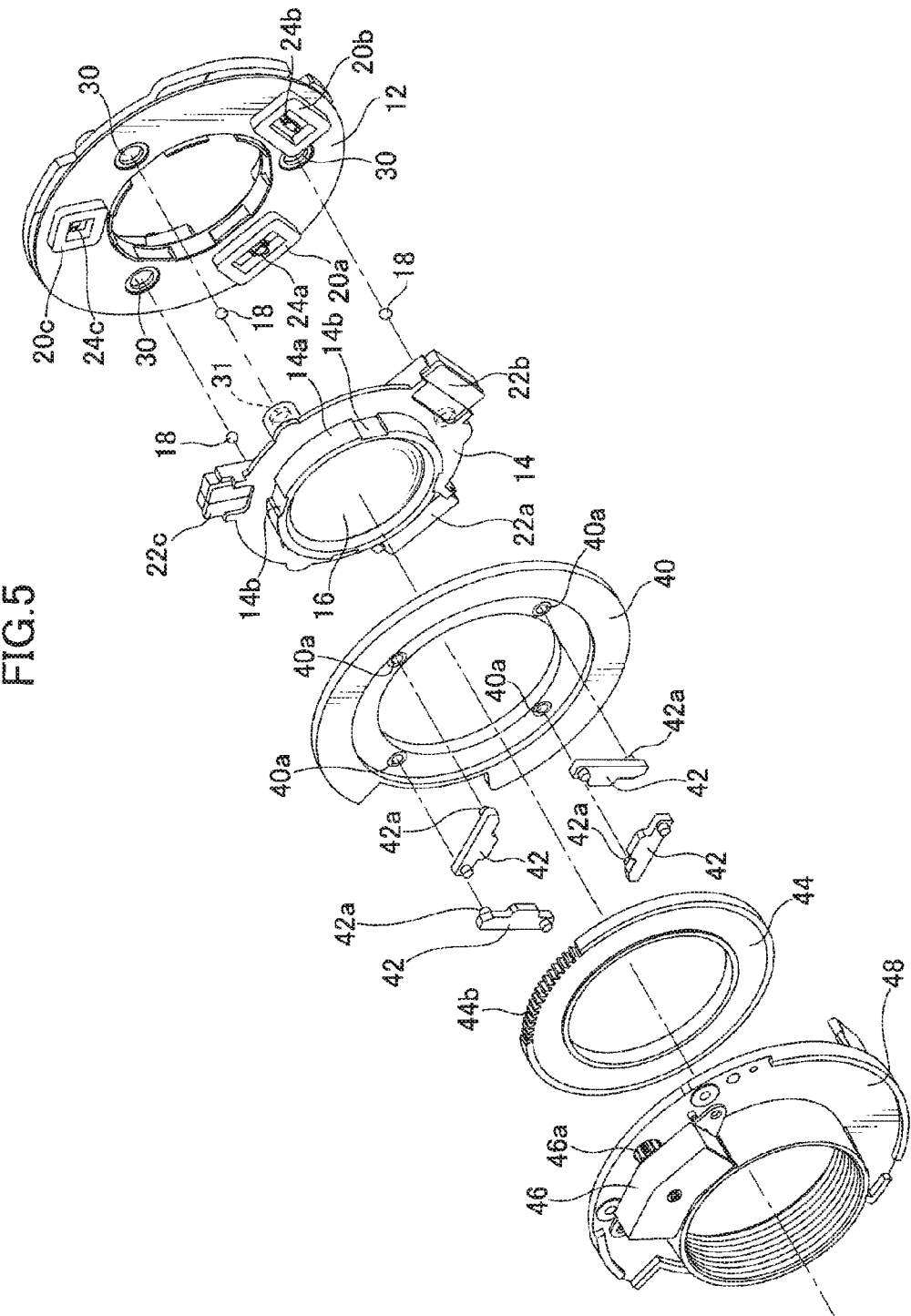
FIG. 5 is an exploded perspective of the movable portion of the anti-vibration actuator.
Figure 6:
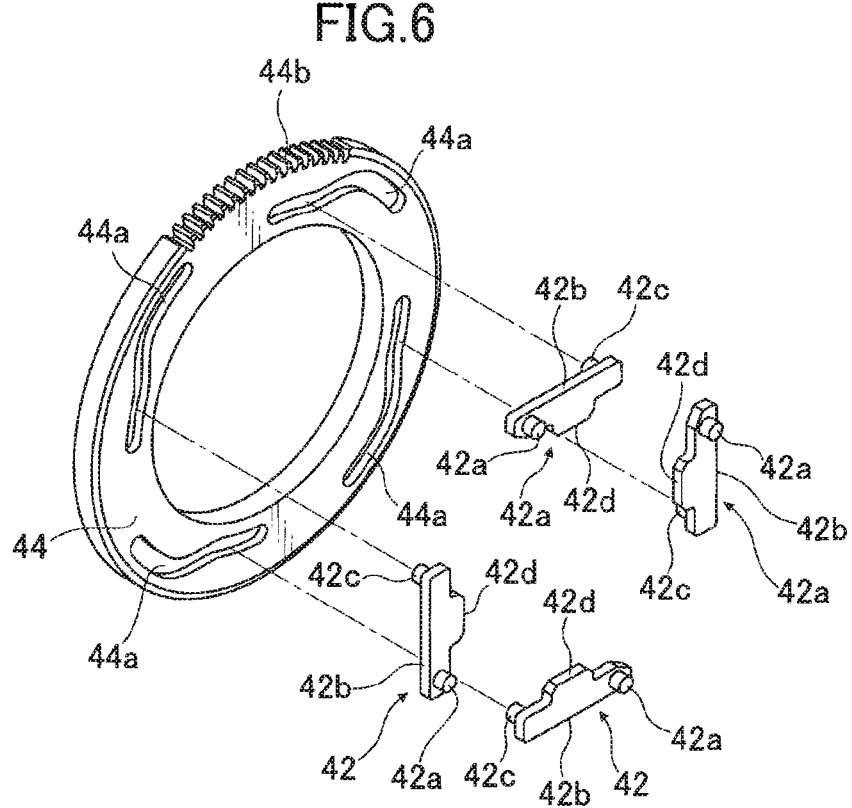
FIG. 6 is a perspective view showing a movable portion locking arm and an arm drive plate for driving same.
Figure 7:
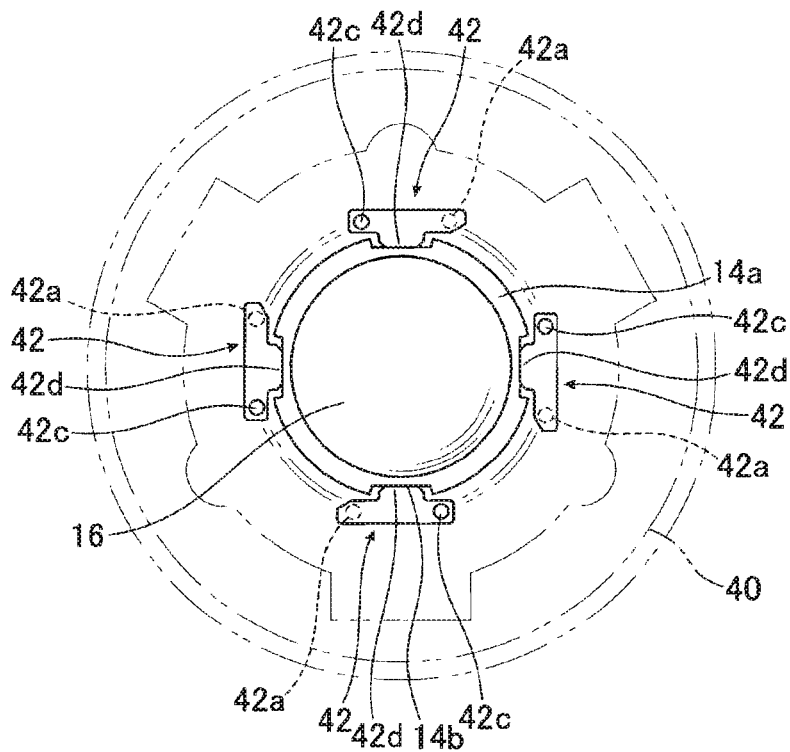
FIG. 7 is a diagram schematically showing an anti-vibration actuator locking mechanism.

Next, referring to FIGS. 2 through 7, we discuss the anti-vibration actuator 10. FIG. 2 is a side elevation sectional diagram of an anti-vibration actuator furnished with a camera according to a first embodiment of the present invention. FIG. 3 is a front elevation of the movable portion in anti-vibration actuator 10; FIG. 4 is a front elevation of the affixing portion shown with the movable portion of the anti-vibration actuator 10 removed. Note that FIG. 2 is a sectional diagram showing the anti-vibration actuator 10 split along line II-II in FIG. 3. FIG. 4 is an exploded perspective of the movable portion of the anti-vibration actuator 10. FIG. 6 is a perspective view showing a movable portion locking arm and an arm drive plate for driving same. FIG. 7 is a diagram schematically showing the locking mechanism of the anti-vibration actuator 10.

As shown in FIGS. 2 through 5, anti-vibration actuator 10 has an affixing plate 12, being a fixed portion affixed within the lens barrel 6, a moving frame 14, being a movable portion and supported so as to be translationally and rotationally movable with respect to the affixing plate 12, and three steel balls 18, being movable support means for supporting the moving frame 14. Moreover, anti-vibration actuator 10 has: a first drive coil 20a attached to fixed plate 12; a second drive coil 20b and third drive coil 20c; first drive magnet 22a, second drive magnet 22b, and third drive magnet 22c attached at positions respectively corresponding to drive coils 20a, 20b, and 20c on moving frame 14; and first magnetic sensor 24a, second magnetic sensor 24b, and third magnetic sensor 24c, which are the first, second, and third position detection elements respectively disposed on the inside of drive coils 20a, 20b, and 20c.

Anti-vibration actuator 10 has a pulling yoke 26 attached to the reverse side of the fixed plate 12 for causing the moving frame 14 to be pulled to the fixed plate 12 by the magnetism of each drive magnet. Note that first drive coil 20a, second drive coil 20b, and third drive coil 20c, and first drive magnet 22a, second drive magnet 22b, and third drive magnet 22c respectively attached at positions corresponding thereto, respectively form first, second, and third drive means for driving the moving frame 14 relative to the fixed plate 12.

In addition, as shown in FIG. 1, anti-vibration actuator 10 has a controller 36, being a control section for controlling the current sourced to first, second, and third drive coils 20a, 20b, and 20c based on vibration detected by gyro 34 and on position information about moving frame 14 detected by first, second, and third magnetic sensors 24a, 24b, and 24c. Anti-vibration actuator 10 also has a memory section 36a for storing the movable portion initial position for in order to move moving frame 14 at the startup of image-blur prevention control.

Anti-vibration actuator 10 moves moving frame 14 translationally in a plane parallel to image capture element C, and is thus driven in such a way that images formed on image capture element C are not distorted even when image-blur prevention lens 16 attached to moving frame 14 is moved and lens barrel 6 vibrates.

As shown in FIGS. 2 and 4, fixed plate 12 has an approximately donut shape, and first, second, and third drive coils 20a, 20b, and 20c are disposed thereon. As shown in FIG. 4, the centers of these three drive coils are respectively disposed on the circumference of a circle centered on the optical axis of lens unit 2. In the present invention, first drive coil 20a is disposed vertically below the optical axis; second drive coil 20b is disposed horizontally relative to the optical axis; and third drive coil 20c is disposed at a position separated by respective central angles of 135° from first drive coil 20a and second drive coil 20b. Therefore first drive coil 20a and second drive coil 20b are separated by a central angle of 90°, second drive coil 20b and third drive coil 20c are separated by a central angle of 135°, and third drive coil 20c and first drive coil 20a are separated by a central angle of 135°.

The windings of first, second, and third drive coils 20a, 20b, and 20c are respectively wound in a rectangular shape with rounded corners. First and second drive coils 20a and 20b are approximately rectangular, and center lines bisecting the long sides thereof are disposed so as to respectively conform to the x and y axes. I.e., the for first and second drive coils 20a and 20b, the length in the direction tangential to a circle centered on optical axis A of the image-blur prevention lens is greater than the length in the radial direction thereof, and the long sides thereof are oriented in a tangential direction. Also, third drive coil 20c has an approximately rectangular shape, smaller than the first and second drive coils, and is disposed so that a center line bisecting the short sides thereof faces in the radial direction of a circle centered on optical axis A.

As shown in FIGS. 2 and 3, moving frame 14 has an approximately donut shape, and image-blur prevention lens 16 is attached at the center opening thereof. Cylindrical perimeter wall portion 14a is formed around the center opening of moving frame 14 to surround the image-blur prevention lens 16. Locking contact surfaces 14b are formed by cutouts on perimeter wall portion 14a at four locations on the outer perimeter surface of perimeter wall portion 14a. Locking contact surfaces 14b are planes constituted by the formation of equally spaced depressions in perimeter wall portion 14a. Details of locking contact surfaces 14b are discussed below.

First, second, and third drive magnets 22a, 22b, and 22c are respectively disposed at positions corresponding to first, second, and third drive coils 20a, 20b, and 20c on the moving frame 14. First and second drive coils 22a and 22b are approximately rectangular, and center lines bisecting the long sides thereof are disposed to respectively match the X and Y axes. First and second drive coils 22a and 22b are magnetized so that the center lines bisecting the short sides thereof form a magnetization boundary line C. Also, third drive coil 20c has an approximately rectangular shape, smaller than the first and second drive magnets, and center lines bisecting the long sides thereof are disposed to conform to the radial direction of a circle. Third drive magnet 22c is magnetized so that the center lines bisecting the long sides thereof form a magnetization boundary line C. I.e., first and second drive magnets 22a and 22b are disposed so that the magnetization boundary line C faces in a direction tangential to a circle centered on optical axis A, and third drive magnet 22c is disposed so that the magnetization boundary line C faces in a direction radial to the circle.

As shown in FIG. 2, first drive magnet 22a magnetization boundary line C is positioned to pass through the center points of each short side of rectangular first drive magnet 22a, and polarity also changes in the thickness direction of first drive magnet 22a. In the present invention, the lower left corner of FIG. 2 is the S pole, while the lower right is the N pole, the upper left is the N pole, and the upper right is the S pole. The second drive magnet 22b is similarly magnetized, and is attached to moving frame 14 at a 90° rotation (FIG. 3). Note that in the present Specification, the magnetization boundary line C refers to a line going connecting the points where polarity changes from S to N midway between the respective ends of the drive magnets when these are designated as the S and N poles.

By being thus magnetized, first and second drive magnets 22a and 22b impart magnetism primarily to the long side part of rectangular first and second drive coils 20a and 20b. Thus when current flows in first drive coil 20a, a drive force is generated in the vertical direction along the Y axis between first drive coil 20a and first drive magnet 22a, and when current flows in second drive coil 20b, a drive force is generated in the horizontal direction along the X axis between second drive coil 20b and second drive magnet 22b.

I.e., the drive force action lines resulting from a first drive means constituted by first drive coil 20a and first drive magnet 22a are directed approximately in the radial direction of image-blur prevention lens 16, and the drive force action lines resulting from a second drive means constituted by second drive coil 20b and second drive magnet 22b are essentially perpendicular to the drive force action line resulting from the first drive means, and are directed in approximately the radial direction of image-blur prevention lens 16.

On the other hand, as shown in FIG. 3, a third drive magnet 22c is disposed so that the magnetization boundary line C faces in the radial direction of a circle centered on optical axis A. When magnetism from the third drive magnet 22c is applied to the part of the third drive coil 20c directed in the radial direction, a drive force is generated if there is current flowing in third drive coil 20c. This drive force acts in the tangential direction of a circle centered on optical axis A in the interval with third drive magnet 22c. The third drive coil 20c and third drive magnet 22c constituting the third drive means are constituted to be smaller than the first and second drive coils and first and second drive magnets, therefore when the same current flows in the drive coils, the drive force generated by the third drive means is smaller than the drive force generated by the first and second drive means.

In the present embodiment the center of gravity of the anti-vibration actuator 10 movable portion (moving frame 14, image-blur prevention lens 16, and the various drive magnets) is essentially positioned on optical axis A, therefore moving frame 14 is translationally moved in an essentially accurate manner in the vertical direction by the drive force of the first drive means directed in the radial direction of a circle centered on optical axis A. Similarly, moving frame 14 is translationally moved in an essentially accurate manner in the horizontal direction by the drive force of the second drive means. The third drive means is disposed to suppress the minute rotational movement generated along with the translational movement of moving frame 14, therefore the drive force required to be generated by the third drive means is smaller than that of the first and second drive means.

As shown in FIGS. 2 and 4, first magnetic sensor 24a, second magnetic sensor 24b, and third magnetic sensor 24c are respectively disposed on the inside of each drive coil. First, second, and third magnetic sensors 24a, 24b, and 24c are constituted to measure the position of moving frame 14 relative to fixed plate 12 in a direction parallel to the drive force action lines generated by the first, second, and third drive means. Each magnetic sensor is disposed so that the sensitivity center point S thereof is positioned on the magnetically neutral axial line C of each drive magnet 22 when the moving frame 14 is in a neutral position. In the present embodiment, a Hall element is used as the magnetic sensor.

The output signal from the magnetic sensors is 0 when the magnetic sensor sensitivity center point S is on the drive magnet magnetization boundary line C, and when a drive magnet moves and the magnetic sensor sensitivity center point S departs from the drive magnet magnetic boundary line C, the magnetic sensor output signal changes. During normal operation of the anti-vibration actuator 10, when drive magnet movement is minuscule, a signal is output which is essentially proportional to the distance moved by the drive magnet in a direction perpendicular to magnetic boundary line C.

For this reason, first magnetic sensor 24a outputs a signal essentially proportional to the degree of translational movement by moving frame 14 in the Y axis direction, and second magnetic sensor 24b outputs a signal approximately proportional to the degree of translational movement by moving frame 14 in the X axis direction. The third magnetic sensor 24c outputs a signal which includes a large rotational movement component of the movement by moving frame 14. The position to which the moving frame 14 has translationally and rotationally moved relative to fixed plate 12 can be identified based on the signals detected by first, second, and third magnetic sensors 24a, 24b, and 24c.

As shown in FIGS. 2 and 4, three steel balls 18 are sandwiched between fixed plate 12 and moving frame 14, and are respectively separated by a central angle of 120° on the perimeter of a circle centered on optical axis A. Depressions 30 are formed on fixed plate 12 at positions corresponding to the steel balls 18. Depressions 31 are formed on moving frame 14 at positions corresponding to the steel balls 18. Each of the steel balls 18 is disposed within these depressions 30 and 31, and falling thereof is thus prevented. Also, as will be described below, because moving frame 14 is pulled to fixed plate 12 by the drive magnets, each of the steel balls 18 is sandwiched between fixed plate 12 and moving frame 14. Thus moving frame 14 is supported on a plane parallel to fixed plate 12, and desired translational and rotational movement of moving frame 14 relative to fixed plate 12 is permitted by the rolling of steel balls 18 as they are sandwiched in place.

As shown in FIG. 2, pulling yokes 26 are approximately rectangular, and are respectively attached on the reverse sides of the drive coils on fixed plate 12. Moving frame 14 is pulled to fixed plate 12 by the magnetic force exerted by each drive magnet on these pulling yokes 26.

Next, referring to FIGS. 5 through 7, we discuss the movable portion locking mechanism of anti-vibration actuator 10.

As shown in FIGS. 5 through 7, the anti-vibration actuator 10 movable portion locking mechanism has: an arm support plate 40; four locking arms 42 rotatably attached to this support plate 40; an arm drive plate 44 for driving these locking arms 42; a drive motor 46 for rotationally driving this arm drive plate 44; and a motor support plate 48 for supporting this drive motor 46.

Arm support plate 40 is a donut-shaped member affixed within the lens barrel 6. Arm support plate 40 is disposed so that the moving frame 14 perimeter wall portion 14a projects through the opening in the center thereof. Four arm bearings 40a disposed on a circle centered on optical axis A are formed on arm support plate 40. The four locking arms 42 are rotatably supported by the arm support plate 40 by having the acceptance by these arm bearings 40a of arm axes 42a on each locking arm 42 such that they are able to rotate.

Locking arms 42 have an arm main unit portion 42b; an arm axis 42a extending from one end portion of this arm main unit portion 42b toward arm support plate 40; a cam follower projection 42c extending from the other end portion of arm main unit portion 42b toward the opposite direction to that of arm axis 42a, and an arm contact portion 42d, which is the contact portion of the movable portion locking mechanism formed in the middle portion of the arm main unit portion 42b.

Arm axis 42a is the cylindrical part extending from one of the end portions of the arm main unit portion 42b in the direction of the optical axis A toward the arm support plate 40, and is received by arm support plate 40 arm bearing 40a in a manner permitting rotation. Locking arms 42 are thus supported so as to be rotatable around arm bearing 40a within a plane parallel to arm support plate 40 (within a plane perpendicular to the optical axis A). At the same time, moving frame 14 perimeter wall portions 14a, formed to surround image-blur prevention lens 16, project from the center opening portion of arm support plate 40, therefore the four locking arms 42 are disposed around image-blur prevention lens 16 and perimeter wall portions 14a.

Cam follower projections 42c are formed on the opposite end portion to that of arm axis 42a on arm main unit portion 42b, and are cylindrical parts extending in the opposite direction to arm axis 42a, in the direction of the optical axis. Note that cam follower projections 42c are received by cam channels 44a erected on arm drive plate 44, and locking arms 42 are rotated by the movement of cam follower projections 42c along cam channels 44a.

Arm contact portions 42d are formed in the midsection of arm main unit portion 42b. As shown in FIG. 7, arm contact portions 42d project radially inward relative to a circle centered on optical axis A within a plane parallel to arm support plate 40. With moving frame 14 in a locked state, contact by arm contact portions 42d with locking contact surfaces 14b disposed on moving frame 14 causes the range over which moving frame 14 can move to be limited to a predetermined locked movable range. More precisely, moving frame 14 is locked with "looseness" by each of the arm contact portions 42d, therefore travel over a minute distance is possible within the locked movable range even in a state whereby each of the locking arms 42 is in a locked position, as shown in FIG. 7.

As shown in FIG. 6, arm drive plate 44 is a donut-shaped member disposed parallel to arm support plate 40. Arm drive plate 44 is supported so as to be rotatable around optical axis A within lens barrel 6. Four cam channels 44a are formed on the face of arm drive plate 44 opposite arm support plate 40. Each of the cam channels 44a is formed to receive the cam follower projections 42c on each of the locking arms 42.

Each cam channel 44a is an elongated channel extending in approximately the circumferential direction of a circle centered on optical axis A; one end portion of each cam channel 44a is positioned radially inward relative to a circle centered on optical axis A, and the other end thereof is positioned radially outward thereto. Therefore the rotation of arm drive plate 44 in a state in which each of the cam channels 44a has received cam follower projection 42c causes each of the locking arms 42 to be rotated about an arm axis 42a. I.e., when cam follower projections 42c are received by the radially inward positioned parts of the cam channels 44a, cam follower projections 42c and arm contact portions 42d are positioned radially inward, and moving frame 14 is in a locked state. When the arm drive plate 44 is rotated and cam follower projections 42c are received by the radially outward positioned parts of cam channels 44a, cam follower projections 42c and arm contact portions 42d are moved radially outward, and the lock on moving frame 14 is released.

In addition, saw tooth-shaped teeth 44b are formed on a portion of the outer perimeter of arm drive plate 44. Meshing of these teeth 44b with the gear 46a attached to the output shaft of the drive motor 46 causes arm drive plate 44 to be rotationally driven by drive motor 46.

Motor 48 is a donut-shaped member affixed within lens barrel 6; drive motor 46 is supported at a predetermined position so that gear 46a attached to the output shaft of drive motor 46 meshes with teeth 44b disposed on arm drive plate 44.

Figure 8:
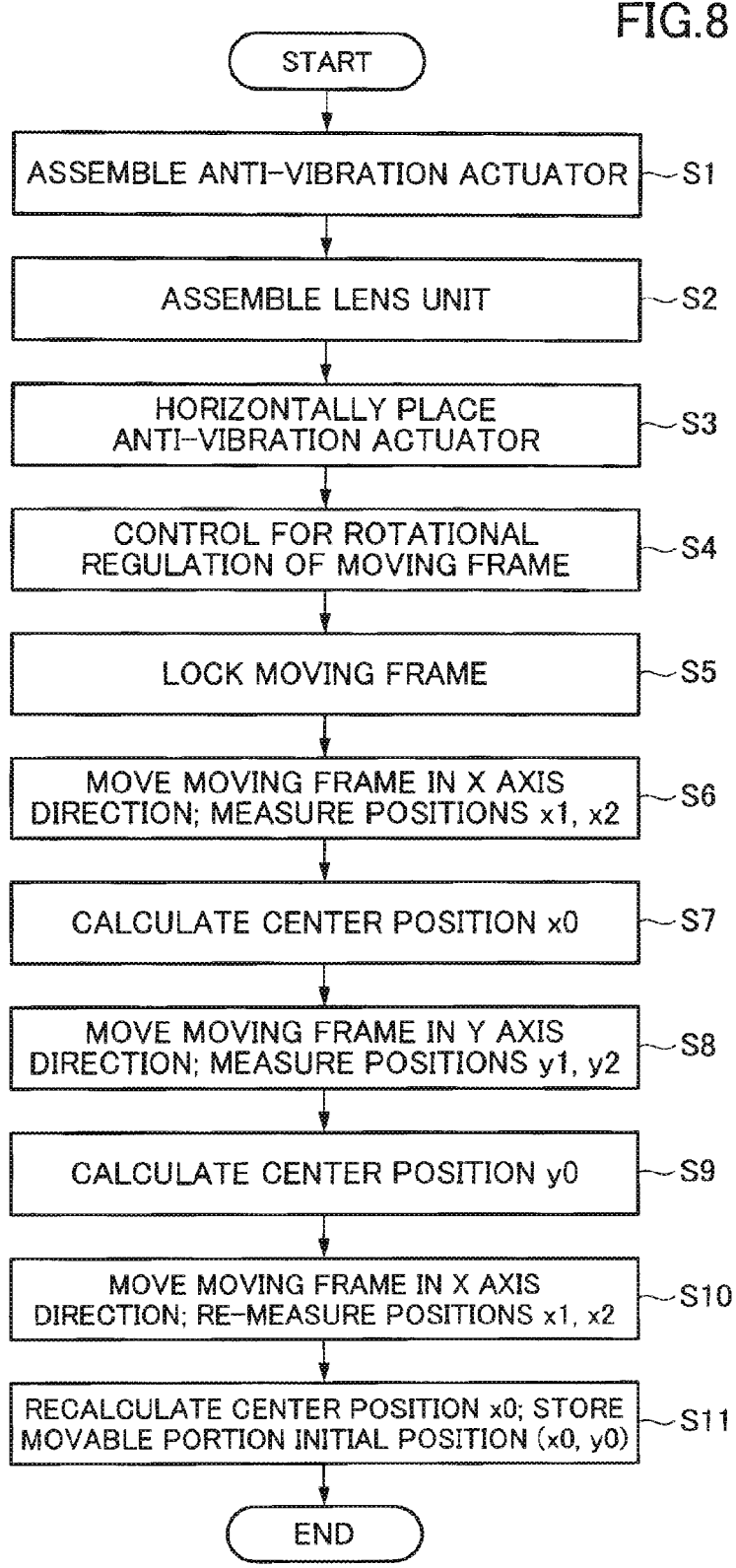
FIG. 8 is a flow chart showing a lens unit manufacturing procedure.

Next, referring to FIGS. 8 through 16, we discuss methods for manufacturing an anti-vibration actuator 10 and a lens unit 2 furnished therewith according to the present embodiment. FIG. 8 is a flow chart showing a procedure for manufacturing a lens unit 2 according to the present embodiment. FIGS. 9 through 16 are diagrams explaining a procedure for adjusting a lens unit 2 according to the present embodiment; it schematically depicts the position of image-blur prevention lens 16.

First, in step S1 of FIG. 8, an anti-vibration actuator 10 is assembled. I.e., a moving frame 14 to which first, second, and third drive magnets or the like are attached is assembled with a fixed plate 12 to which first, second, and third drive coils and first, second and third magnetic sensors are attached. At this time, three steel balls 18 are disposed between these members so as to be sandwiched between anti-vibration actuator 10 and moving frame 14. Next, four locking arms 42 are disposed between arm support plate 40 and arm drive plate 44, and a movable portion locking mechanism is assembled by attaching a motor support plate 48 to which a drive motor 46 has been attached. Anti-vibration actuator 10 is assembled by joining the assembled movable portion locking mechanism to fixed plate 12.

In step S2, a lens unit 2 is assembled by disposing an image capturing lenses 8, an anti-vibration actuator 10, and the like within lens barrel 6.

Next, in steps S3 through S11, anti-vibration actuator 10 is adjusted.

Figure 9:
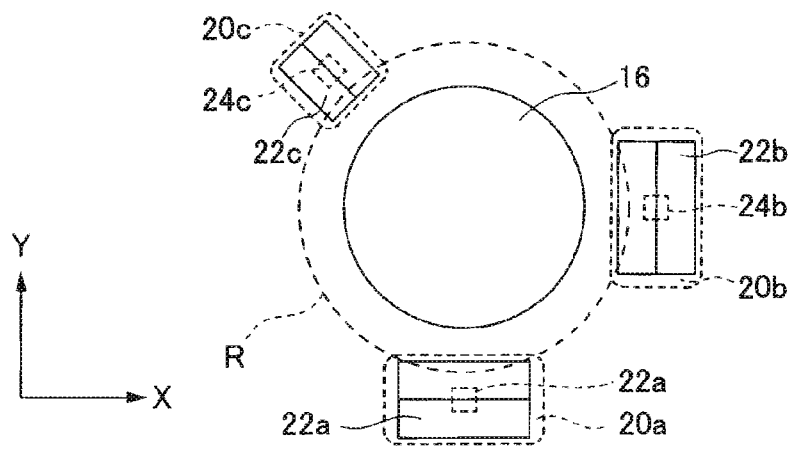
FIG. 9 is a diagram explaining a procedure for adjusting a lens unit in a first embodiment of the present invention.
Figure 10:
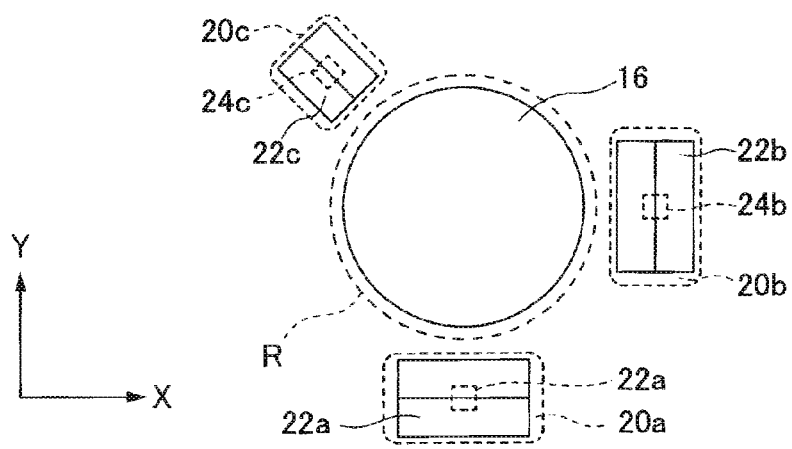
FIG. 10 is a diagram explaining a procedure for adjusting a lens unit in a first embodiment of the present invention.

First, in step S3, assembled lens unit 2 is horizontally disposed so that anti-vibration actuator 10 moving frame 14 is not moved by gravity. In this state, because no locking by the movable portion locking mechanism is occurring, moving frame 14 can be moved up to its movable end as shown in FIG. 9, and the image-blur prevention lens 16 attached to moving frame 14 can be moved within approximately the range shown by the dotted line in the figure. As shown in FIG. 10, on the other hand, in this locked state moving frame 14 is locked by each of the locking arms 42, but even in this state there is a slight "looseness" (play), and image-blur prevention lens 16 can move within the locked movable range R approximately shown by the dotted line in FIG. 10. Note that in FIG. 10 the locked movable range R is shown in an exaggerated fashion for explanatory purposes; in reality the amount of movement within the locked movable range R is on the order of a few tens of microns.

Next, in step S4, the moving frame 14 is controlled to a state in which only translational movement is possible. Specifically, no electricity flows to first drive coil 20a and second drive coil 20b for generating drive force in the Y axis and X axis directions (FIG. 4); the position in the Y axis direction of first drive magnet 22a is detected by first magnetic sensor 24a, and the position in the X axis direction of second drive magnet 22b is detected by second magnetic sensor 24b. Here the positions detected by the first and second magnetic sensors are respectively y and x. In this state, current is sourced to third drive coil 20c so that the displacement v in the V axis direction (FIG. 4) of the third drive magnet 22c detected by third magnetic sensor 24c becomes:

$$v = \frac{\sqrt{2}}{2}x + \frac{\sqrt{2}}{2}y, \tag{1}$$

and a drive force is generated between third drive coil 20c and third drive magnet 22c.

Rotation around optical axis A by moving frame 14 is thus regulated, and only translational movement is possible. I.e., in a state in which moving frame 14 is being translationally moved, the relationship set forth in Expression (1) obtains at all times for deflections in the X, Y, and V axis directions.

Figure 11:
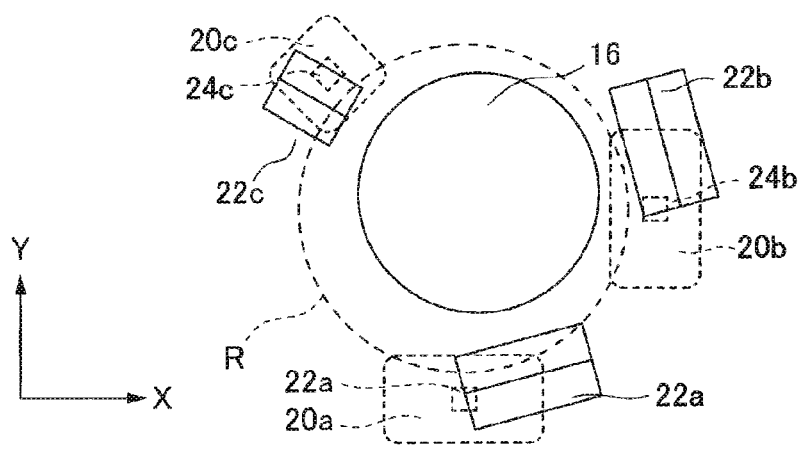
FIG. 11 is a diagram explaining a procedure for adjusting a lens unit in a first embodiment of the present invention.
Figure 12:
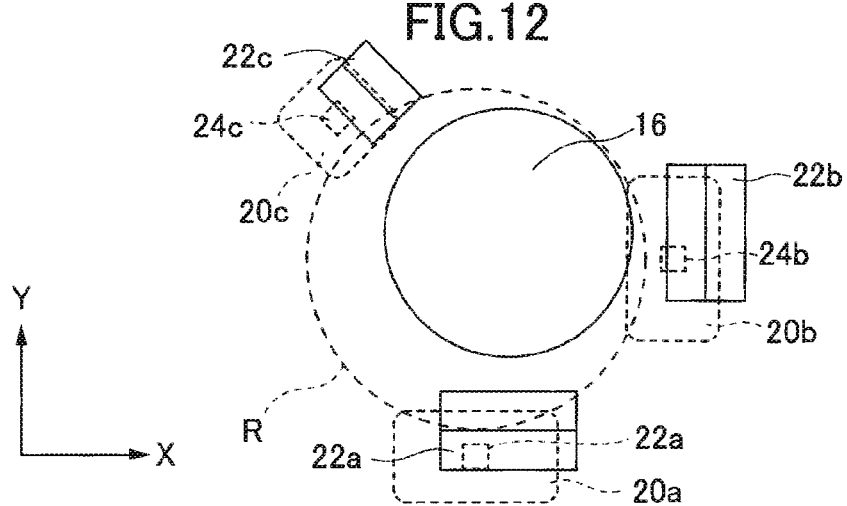
FIG. 12 is a diagram explaining a procedure for adjusting a lens unit in a first embodiment of the present invention.

Therefore by controlling displacement v relative to detected deflections x, y so as to satisfy the relationship in Expression (1), rotation of moving frame 14 is regulated, and only translational movement of moving frame 14 is permitted. By thus controlling moving frame 14, the moving frame 14 which had been rotated as shown in FIG. 11, is regulated to a rotational angle of 0, as shown in FIG. 12, and fixed plate 12 is able to move translationally while holding its rotational position as is.

Figure 13:
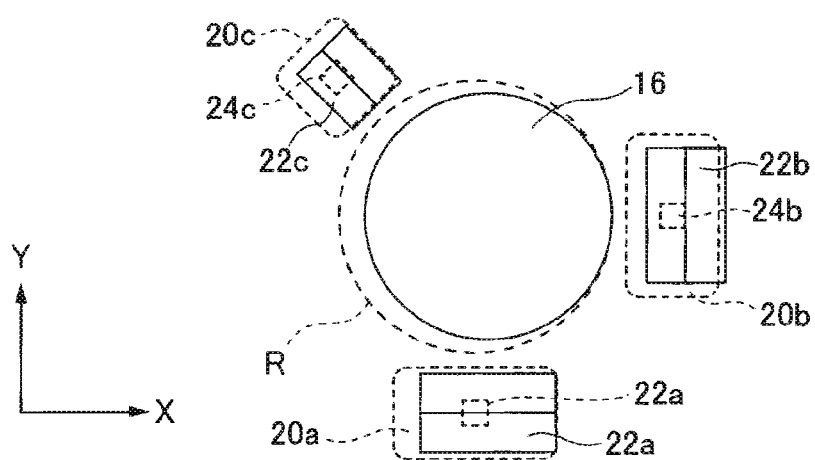
FIG. 13 is a diagram explaining the procedure for adjusting a lens unit in a first embodiment of the present invention.

In step S5, the movable portion locking mechanism is placed in a locked state with the step S4 controls maintained as is. I.e., each of the locking arms 42 is moved radially inward. Thus moving frame 14, which had been positioned outside the locked movable range R in a non-locked state, is pressed by one of the locking arms 42, and moving frame 14 is moved within the locked movable range R while its rotational position is maintained. In this state, as shown in FIG. 13, image-blur prevention lens 16 is positioned at the end portion of the locked movable range R. Thereafter, adjustment of anti-vibration actuator 10 is carried out with the moving portion locking mechanism in a locked state.

Figure 14:
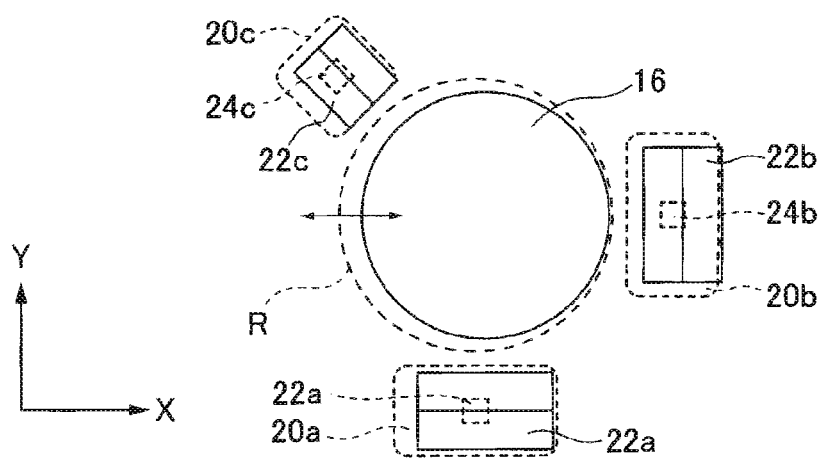
FIG. 14 is a diagram explaining the procedure for adjusting a lens unit in a first embodiment of the present invention.

Next, in step S6, a weak current is sourced to second drive coil 20b, with the step S4 control maintained as is. This current is not determined by feedback of the positions detected by each of the magnetic sensors; it is a pre-set fixed current. As shown in FIG. 14, moving frame 14 is translationally moved by this current in the X axis direction, being a first direction, while maintaining its rotational position, and locks in a state in which locking contact surfaces 14b on moving frame 14 make contact with arm contact portions 42d on locking arms 42. A second magnetic sensor 24b measures position x1 in the X axis direction of second drive magnet 22b in this state, and this position x1 is stored in memory section 36a.

Next, a weak current is sourced in the opposite direction to second drive coil 20b. A moving frame 14 is translationally moved by this current in the opposite direction along the X axis, and moving frame 14 stops in a state of contact with the locking arm 42 on the opposite side to the locking arm 42 which it had been contacting. A second magnetic sensor 24b measures position x2 in the X axis direction of second drive magnet 22b in this state, and this position x2 is stored in memory section 36a. Thus in step S6, the range over which moving frame 14 can move in the X axis direction is measured.

In step S7, a position x0 in the center of positions x1 and x2 is calculated by controller 36, and the calculated position x0 is stored in memory section 36a.

Next, in step S8 the rotational position of moving frame 14 is first regulated, while at the same time the position of moving frame 14 in the X axis direction is regulated to the position x0 calculated in step S7. I.e., relative to third drive coil 20c, current is controlled so that the position in the V axis direction detected by third magnetic sensor 24c becomes the deflection v calculated in Expression (1), and relative to second drive coil 20b, current is controlled so that the position in the X axis direction detected by second magnetic sensor 24b becomes position x0. As described above, this position x0 is the center position in the movable range of moving frame 14 in the X axis direction. Moving frame 14 is thus translationally moved in a state whereby its position in the X axis direction is fixed at position x0 at the center of the movable range.

Furthermore, in step S8 a weak current is sourced to first drive coil 20a. This current is not determined by feedback of the positions detected by each of the magnetic sensors; it is a pre-set fixed current. As shown in FIG. 14, moving frame 14 is translationally moved by this current in the Y axis direction, being a second direction perpendicular to the X axis direction, while maintaining its rotational position and position x0 in the X axis direction, and locks in a state in which locking contact surfaces 14b on moving frame 14 make contact with arm contact portions 42d on locking arms 42. A first magnetic sensor 24a measures position y1 in the Y axis direction of first drive magnet 22a in this state, and this position y1 is stored in memory section 36a.

Next, a weak current is sourced in the opposite direction to first drive coil 20a. The moving frame 14 is translationally moved by this current in the opposite direction along the Y axis, and moving frame 14 locks in contact with the locking arm 42 on the opposite side to the locking arm 42 which it had been contacting. A first magnetic sensor 24a measures position y2 in the Y axis direction of first drive magnet 22a in this state, and this position y2 is stored in memory section 36a. Thus in step S8, the range over which moving frame 14 can move in the Y axis direction is measured.

In step S9, a position y0 in the center of positions y1 and y2 is calculated by controller 36, and the calculated position y0 is stored in memory section 36a.

Next, in step S10 the rotational position of moving frame 14 is first regulated, while at the same time the position of moving frame 14 in the Y axis direction is regulated to the position y0 calculated in step S9. Note that in step S10, control relative to the position of moving frame 14 in the X axis direction is released. Furthermore, in step S10, as in step S6, a weak current is sourced to second drive coil 20b. As described above, this position y0 is the center position of the movable range in the Y axis direction by moving frame 14. Moving frame 14 is translationally moved in the X axis direction while rotational position and position y0 at the center of the movable range in the Y axis direction are maintained as is, and locks in a state in which locking contact surfaces 14b on moving frame 14 make contact with arm contact portions 42d on locking arms 42. Second magnetic sensor 24b again measures position x1 in the X axis direction of second drive magnet 22b in this state, and this position x1 is stored in memory section 36a.

Furthermore, a weak current is sourced in the opposite direction to second drive coil 20b, and moving frame 14 is translationally moved in the X axis direction; moving frame 14 locks in contact with the locking arm 42 on the opposite side. Second magnetic sensor 24b newly measures position x2 in the X axis direction of second drive magnet 22b in this state, and this position x2 is stored in memory section 36a. Thus in step S10, the range over which moving frame 14 can move in the X axis direction is measured.

In step S11, a position x0 in the center of newly measured positions x1 and x2 is calculated by controller 36, and the newly calculated position x0 is stored in memory section 36a. The position x0 thus calculated, and the position y0 calculated in step S9, are written as a movable portion initial position to an electrically erasable programmable read only memory (EEPROM) in memory section 36a and used for control when the lens unit 2 is actual use. Thus the movable portion initial position is determined at a position within the movable range in the X axis direction and the movable range in the Y axis direction. As shown in FIG. 16, the positions thus obtained (x0, y0) are positioned at essentially the center of the locked movable range R in which only movements of a few 10s of microns are permitted. When moving frame 14 is moved to this movable portion initial position (x0, y0), a small gap is present between the arm contact portions 42d on each locking arm 42 and the locking contact surfaces 14 on the moving frame 14, even in the locked state.

Note that when adjusting the anti-vibration actuator 10 it is also possible to repeat the processes of steps S8 through S11 multiple times, adopting the last calculated position (x0, y0) as the movable portion initial position. Alternatively, the processes of steps S10 and S11 may be omitted.

In the above-described embodiment the respective center positions (x0, y0) of the movable range in the X axis and Y axis directions were adopted as the movable portion initial position, but any desired position may be set as the movable portion initial position so long as that position is within the movable range in each direction. By setting the movable portion initial position within the movable range in each direction, contact can be avoided between moving frame 14 and locking arms 42 (the moving portion locking mechanism contacting portion) when moving frame 14 is moved to the movable portion initial position.

Next, referring to FIG. 1, we discuss the operation of a camera 1 according to a first embodiment of the present invention. First, turning on the startup switch (not shown) for the anti-shake function in camera 1 actuates the anti-vibration actuator 10 with which lens unit 2 is furnished. Gyro 34 to which the lens unit 2 is attached detects vibration in a predetermined frequency bandwidth from moment to moment, outputting same to a computation circuit (not shown) built into controller 36. Gyro 34 outputs an angular velocity signal to the computation circuit; the computation circuit integrates the input angular velocity signal over time, calculates shake angle, adds a predetermined modifying signal to this, and generates a lens position command signal. By moving image-blur prevention lens 16 so as to follow at the position commanded by the lens position command signal output in a time sequence by the computation circuit, images focused on film surface F of the camera body 4 are stabilized.

Controller 36 outputs to each drive coil a current responsive to the difference between the detection signals of each magnetic sensor and the lens position command signal in each direction. When current flows in each drive coil, a magnetic field proportional to current is created. First, second, and third drive coils 20a, 20b, and 20c, disposed to correspond to first, second, and third drive magnets 22a, 22b, and 22c, respectively receive a drive force from this magnetic field, and moving frame 14 is moved. When moving frame 14 is moved by a drive force and each of the drive coils reaches a position designated by the lens position command signal, the drive force goes to 0. Also, when moving frame 14 departs from the position designated by the lens position command signal due to an external disturbance or to changes or the like in the lens position command signal, current is again sourced to each of the drive coils, and moving frame 14 is returned to the position designated by the lens position designating signal.

By thus repeating the above-described process, the image-blur prevention lens 16 attached to moving frame 14 is moved so as to follow the lens position command signal. Images focused on the image capture element C of camera body 4 are thus stabilized.

Next, when camera 1 anti-shake function startup switch (not shown) is turned off, controller 36 positions moving frame 14 at the movable portion locked position and locks it. I.e., controller 36 sends a signal to drive motor 46, rotating gear 46a. When gear 46a is rotated, arm drive plate 44 is rotated in the direction shown as clockwise in FIG. 6. When arm drive plate 44 is rotated clockwise, cam follower projections 42c, which had been received by the radially outward parts of cam channels 44a, now become received by the radially inward part of cam channels 44a, as a result of which locking arms 42 are rotated to the arm locked position, and cam follower projections 42c and arm contact portions 42d are moved radially inward. As shown in FIG. 7, when arm contact portions 42d are moved radially inward, the range over which image-blur prevention lens 16 (moving frame 14) can move is limited to locked movable range R, and moving frame 14 is locked.

When moving frame 14 is locked, energization to drive coils is stopped. While moving frame 14 can move about within the locked movable range R, the optical axis of image-blur prevention lens 16 essentially fits the optical axis of image capture lens 8.

Next, when the camera 1 anti-shake function switch (not shown) is turned on, controller 36 supplies current to each of the drive coils, and moving frame 14 is moved to the movable portion initial position (x0, y0) stored in memory section 36a. As described above, this movable portion initial position (x0, y0) is adjusted at the time of manufacture of lens unit 2, and is the position stored in memory section 36a. When moving frame 14 is moved to this movable portion initial position (x0, y0), a state is achieved whereby moving frame 14 does not contact either of the locking arms 42 within the extremely narrow locked movable range R.

Next, controller 36 sends a signal to drive motor 46, rotates gear 46a, and rotates arm drive plate 44 in the counterclockwise direction as seen in FIG. 6. When arm drive plate 44 is rotated counterclockwise, cam follower projections 42c, which had been received by the radially outward parts of cam channels 44a, become accepted by the radially outward part of cam channels 44a, as a result of which locking arms 42 are rotated, and cam follower projections 42c and arm contact portions 42d are moved radially outward. When arm contact portions 42d are moved radially outward, each of the arm contact portions 42d separates from its opposing locking contact surface 14b, and the lock on moving frame 14 is released. In other words, moving frame 14 goes into an unlocked state.

At this time, electricity is flowing to each drive coil, and moving frame 14 is controlled to be in the movable portion initial position (x0, y0), therefore moving frame 14 does not drop due to gravity when the lock is released. In addition, immediately prior to release of the locked state the moving frame 14 is controlled to a state whereby it does not contact either of the locking arms 42, therefore moving frame 14 is not greatly moved by the drive force when the lock is released, and is able to smoothly transition to image-blur prevention control. I.e., if moving frame 14 is controlled to a position in contact with either of the locking arms 42 immediately prior to release of the locked state, moving frame 14 will be in a state whereby it is pushed by the drive force into an arm contact portion 42d on a locking arm 42. In such a state, reaction force from the locking arms 42 which had been resisting the drive force acting on moving frame 14 ceases to act when the lock is released, therefore moving frame 14 is moved significantly, overshooting the position it had been targeting, and the image formed in the finder becomes greatly distorted. This type of problem can be avoided using the camera of the present embodiment.

Note that the locked movable range R over which moving frame 14 can move in a locked state is an extremely small region, and this locked movable range R is affected by the dimensional accuracy, etc. of each constituent component of the movable portion locking mechanism. On the other hand, positioning accuracy of the initial position to which the moving frame 14 is moved when image-blur prevention control begins is affected by the dimensional accuracy of each of the drive magnets, magnetic sensors, and the like, and by position accuracy, individual differences, and the like. Therefore in cases where no adjustment is performed at time of manufacture, such as in the lens unit 2 manufacturing method according to the present embodiment, it is extremely difficult to position moving frame 14 in a position at which moving frame 14 does not make contact with each of the locking arms 42 in the locked state. Since this type of positioning is particularly difficult in cases where the locked movable range R has been designed to very small in order to improve image quality during non-image-blur prevention control.

Furthermore, in the lens unit 2 of the present embodiment the movable portion initial position (x0, y0) is adjusted to be at approximately the center of the locked movable range R, therefore even when locked movable range R changes due to the passage of years, etc., contact between moving frame 14 and each of the locking arms 42 can be reliably prevented.

Using the anti-vibration actuator 10 of the first embodiment of the present invention, moving frame 14 is moved at the start of image-blur prevention control to a movable portion initial position (x0, y0) inside the locked movable range R determined by prior adjustment (FIG. 16). Therefore at the time of image-blur prevention control startup, a position at which moving frame 14 cannot be moved in the locked state is adopted as the target position, so that control of moving frame 14 can be prevented and associated problems avoided. Thus using the anti-vibration actuator 10 of the present embodiment, a smooth transition to image-blur prevention control can be achieved even when "looseness" has been designed to be small in the locked state.

Also, using the anti-vibration actuator 10 of the present embodiment, the movable portion initial position (x0, y0) is determined at a position where moving frame 14 and arm contact portions 42*d* (the contacting portion of the movable portion locking mechanism) on locking arms 42 do not contact, therefore in the locked state no force is mutually exerted between moving frame 14 moved to the movable portion initial position (x0, y0) and arm contact portions 42*d*, and major overshooting of the moving frame 14 position by the control force when the locked state is released can be prevented.

Using the lens unit manufacturing method of the first embodiment of the present invention, the movable portion initial position is determined within the movable range in the actual measured X axis and Y axis directions (x1-x2; y1-y2), therefore the movable portion initial position (x0, y0) will not be set to a position to which moving frame 14 cannot be moved in the locked state. Therefore at the time of image-blur prevention control startup, a position at which moving frame 14 cannot be moved in the locked state is adopted as the target position, so that control of moving frame 14 can be prevented and associated problems avoided. Furthermore, in the manufacturing method of the present embodiment, the movable portion locked movable range R, which is affected by the dimensional accuracy and positioning accuracy of the various components of the movable portion locking mechanism (arm support plate 40, locking arms 42, arm drive plate 44), can be measured with lens unit 2 in an assembled state, therefore the movable portion initial position can be accurately determined.

Using the lens unit manufacturing method of the present embodiment, the movable portion initial position is determined at the center (x0, y0) of the movable range in the X axis and Y axis directions, therefore the movable portion initial position can be determined at the position at which it is most difficult for moving frame 14 to contact locking arms 42 (movable portion locking mechanism). Thus even if locked movable range R changes due to the passage of years or the like, contact between moving frame 14 and locking arms 42 can be reliably prevented.

Also, using the lens unit manufacturing method of the present embodiment, during the adjustment stage rotation of the movable portion is regulated (FIG. 8, step S4), therefore when measuring the locked movable range R (FIG. 8, steps S6, S8, S10), moving frame 14 is always contacting the arm contact portions 42*d* of locking arms 42 at the same attitude, and the locked movable range can be accurately measured.

Figure 17:
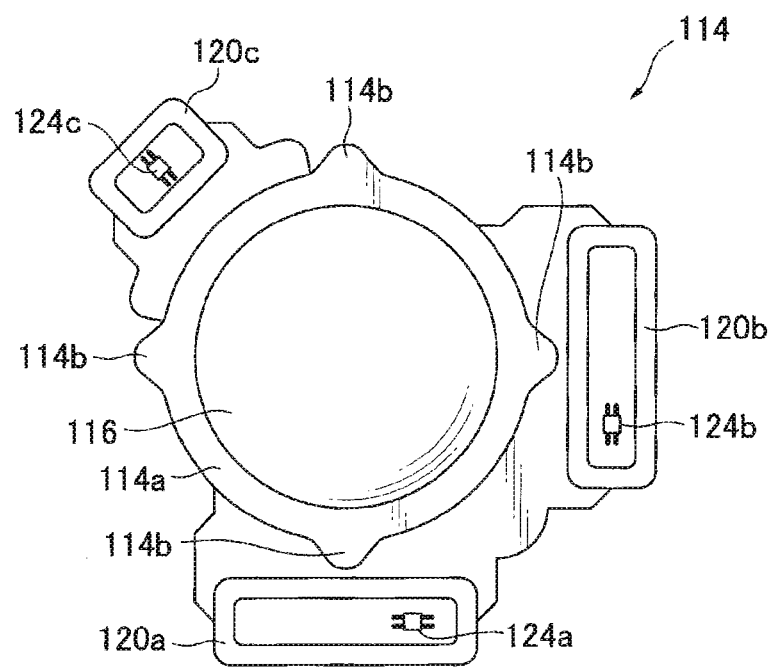
FIG. 17 is a front elevation showing the movable portion of an anti-vibration actuator built into a camera according to a first embodiment of the present invention.
Figure 18:
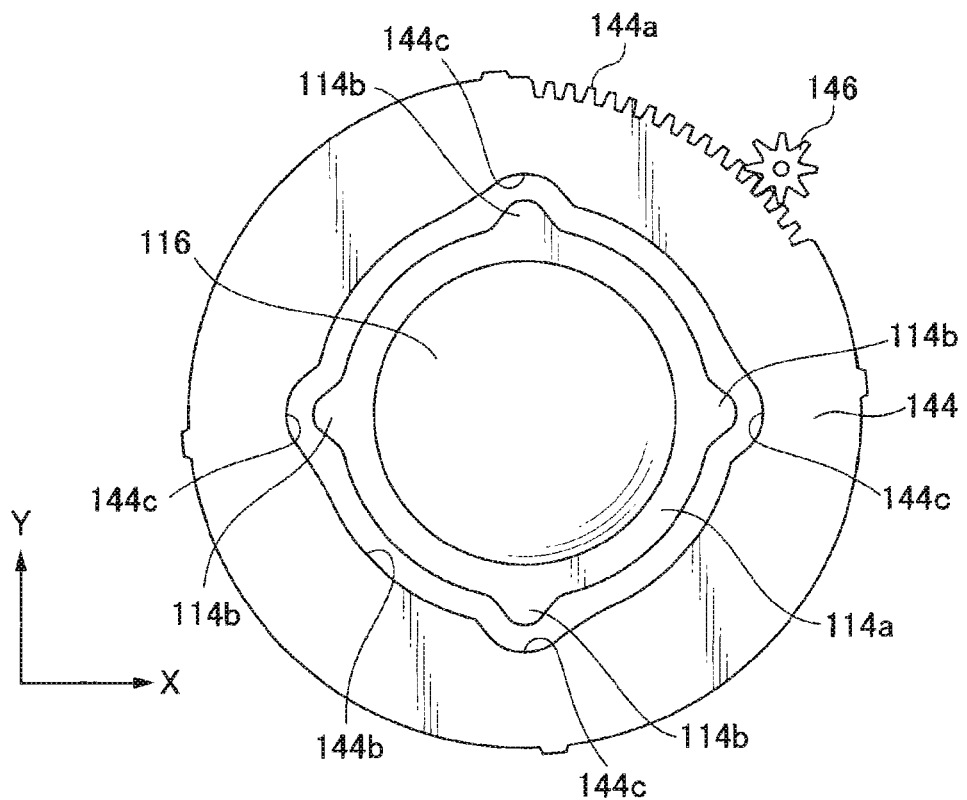
FIG. 18 is a diagram showing the anti-vibration actuator movable portion with the lock released.
Figure 19:
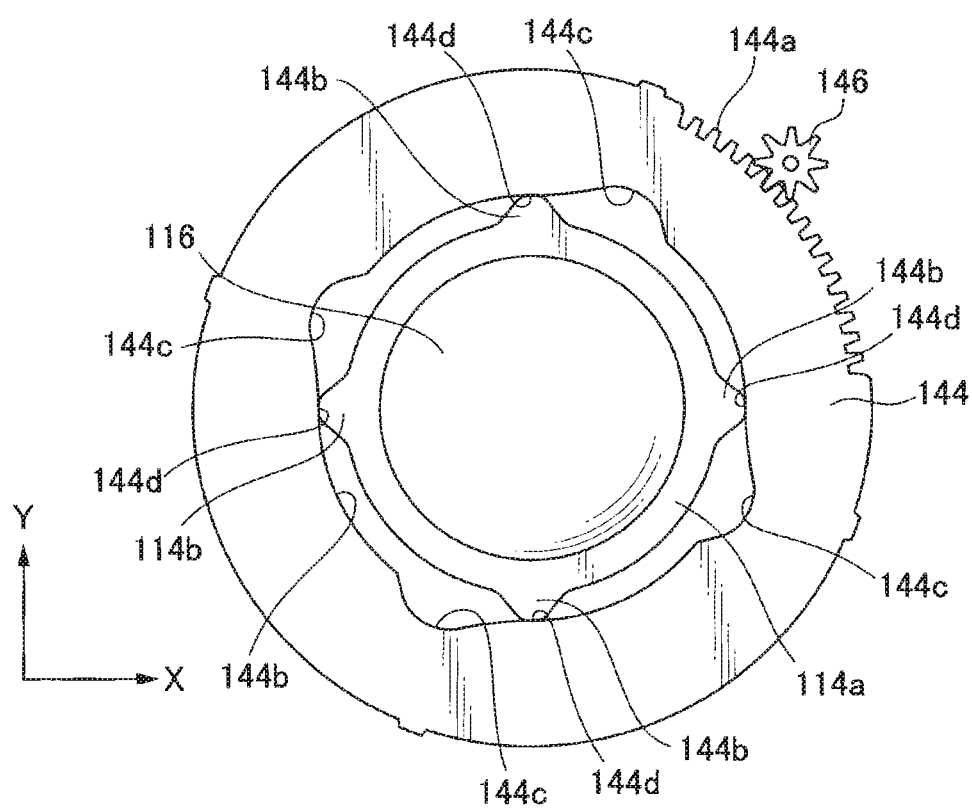
FIG. 19 is a diagram showing the anti-vibration actuator movable portion in a locked state.

Next, referring to FIGS. 17 through 19, we discuss a camera according to a second embodiment of the present invention. The camera of the present embodiment differs in the constitution of its built-in anti-vibration actuator; more particularly the movable portion locking mechanism thereof differs from the above-described first embodiment. Therefore we shall explain here only points pertaining to the present embodiment which differ from the first embodiment, and will omit discussion of similar constitutions, operations, and effects.

FIG. 17 is a front elevation showing the movable portion of an anti-vibration actuator built into a camera according to a first embodiment of the present invention. FIG. 18 is diagram showing the anti-vibration actuator movable portion with the lock released. FIG. 19 is a diagram showing the anti-vibration actuator movable portion in a locked state.

As shown in FIG. 17, attached to the center portion of moving frame 114, which is the movable portion of an anti-vibration actuator in the present embodiment, is an image-blur prevention lens 116. Three drive coils 120*a*, 120*b*, and 120*c* are attached to moving frame 114 around the image-blur prevention lens 116. In this embodiment, three drive coils are attached to moving frame 114, while three drive magnets (not shown) respectively facing these drive coils are attached on the fixed plate side (not shown). Thus, except for the opposite attachments of drive coils and drive magnets, the constitution, placement, and functionality of each of the drive coils and drive magnets are the same as in the first embodiment. In addition, first magnetic sensor 124*a*, second magnetic sensor 124*b*, and third magnetic sensor 124*c* are respectively disposed on the inside of drive coils 120*a*, 120*b*, and 120*c*. The position of moving frame 114 relative to the fixed plate (not shown) is detected by these magnetic sensors.

Furthermore, cylindrical perimeter wall portions 114*a* are formed on moving frame 114 so as to surround image-blur prevention lens 116. Four locking contact surfaces 114*b* are erected on the outer perimeter surface of these perimeter wall portions 114 so as to project radially outward. These locking contact surfaces 114*b* are equally spaced on the outer perimeter surface of perimeter wall portions 114*a*, and the leading end portions thereof function as locking contact surfaces.

As shown in FIG. 18, a locking ring 144 is disposed on the outside of perimeter wall portions 114*a* so as to surround perimeter wall portions 114*a*. This locking ring 144 is an approximately donut-shaped member, disposed within the lens barrel (not shown) so as to be rotatable around the optical axis. Teeth 144*a* are formed on part of the outer edge of this locking ring 144. These teeth 144*a* mesh with a gear 146 driven by a drive motor (not shown). Operating a drive motor causes locking ring 144 to be rotated from the lock release position shown in FIG. 18 to the locked position shown in FIG. 19. This locking ring 144, gear 146, and drive motor (not shown) constitute a movable portion locking mechanism.

Furthermore, an approximately circular opening portion 144*b* is provided at the center of locking ring 144, and perimeter wall portions 114*a* on moving frame 114 are inserted into this opening portion 144*b*. In addition, indentations 144*c* are respectively disposed at positions facing the four projections 114b disposed on the perimeter wall portions 114a. By providing these indentations 144c, interference by the locking ring 144 with the moving frame 114 is avoided when the locking ring 144 is in a lock-released state (during image-blur prevention control).

As shown in FIG. 19, when the drive motor (not shown) is operated and locking ring 144 is rotated to the locked position, each of the indentations 144c on locking ring 144 is respectively moved and placed in a state such that they do not face the projections 114b. Thus projections 114b are made to approach the edge portion of opening portion 144b, the range over which moving frame 114 can move is limited to being within the locked movable range, and moving frame 114 is locked. In the locked state shown in FIG. 19, the parts of the inner perimeter surface of moving frame 114 opposing projections 114b on moving frame 114 respectively function as contact portions 144d of the movable portion locking mechanism.

The lens unit manufacturing steps of the present embodiment are the same as the flow chart in the first embodiment shown in FIG. 8. Note that in the present embodiment, in step S5 of FIG. 8 the moving frame 114 is placed in a locked state by operating the drive motor (not shown), rotating locking ring 144 from the lock released position shown in FIG. 18 to the locked position shown in FIG. 19. At this point, because control is exercised to regulate the rotation of moving frame 114 (step S4 in FIG. 8), moving frame 114 does not get rotated together with locking ring 144.

Also, in the present embodiment the adjustment procedure from steps S6 through S11 in FIG. 8 is exactly the same as in the first embodiment. In these steps, that is, in the locked state shown in FIG. 19 moving frame 114 is moved in the X axis and Y axis directions, respectively, the movable portion initial position (x0, y0), being essentially the center of the locked movable range, is calculated, and that value is stored in a memory section (not shown).

Using the anti-vibration actuator of the second embodiment of the present invention, a movable portion locking mechanism can be constituted with a small number or parts.

We have described above preferred embodiments of the present invention, but various changes may also be added to the above-described embodiments. In particular, in the above-described embodiments the present invention was applied to a digital camera, but the present invention may be applied to any desired still picture or moving picture image capturing camera, such as a film camera, video camera, or the like. The present invention may also be applied to lens units used together with the camera bodies of these cameras.

Also, in the above-described embodiments, moving frame 14 was driven by a first and second drive coil for generating a drive force in the X axis and Y axis directions, and a third drive coil for generating drive force in a direction tangential to a circle centered on the optical axis, but the drive means apparatus may be changed as appropriate. For example, the present invention may be used on anti-vibration actuators furnished with a drive means of the type in which three drive coils for generating drive force in a direction tangential to a circle centered on the optical axis are disposed at equal spacings, or a drive means of the type in which three drive coils for generating a drive force in the radial direction of a circle are disposed at equal spacings.

EXPLANATION OF REFERENCE NUMERALS

1: Camera according to an embodiment of the present invention
2: Lens unit
4: Camera body
6: Lens barrel
8: Image capturing lens
10: Anti-vibration actuator
12: Fixed plate (fixed portion)
14: Moving frame 14 (movable portion)
14a: Perimeter wall portions
14b: Locking contact surfaces
16: Image-blur prevention lens
18: Steel balls (movable portion support means)
20a: First drive coil
20b: Second drive coil
20c: Third drive coil
22a: First drive magnet
22b: Second drive magnet
22c: Third drive magnet
24a: First magnetic sensor
24b: Second magnetic sensor (second position detection element)
24c: Third magnetic sensor (third position detection element)
26: Pulling yoke
30: Indentation
31: Indentation
34: Gyro
36: Controller (control section)
36a: Memory section
40: Arm support plate
40a: Arm bearings
42: Locking arms
42a: Arm axis
42b: Arm main unit portion
42c: Cam follower projections
42d: Arm contact portions
44: Arm drive plate
44a: Cam channels
44b: Teeth
46: Drive motor
46a: Gear
48: Motor support plate
114: Moving frame (movable portion)
114a: Perimeter wall portions
114b: Projections
116: Image-blur prevention lens
144: Locking ring
144a: Teeth
144b: Opening portion
144c: Indentations
144d: Contacting portions
146: Gear

The invention claimed is:

1. A method for manufacturing a lens unit furnished with an anti-vibration actuator for executing image-blur prevention control, comprising steps of:
disposing an image capturing lens and an anti-vibration actuator inside a lens barrel;
placing a movable portion locking mechanism of the anti-vibration actuator in a locked state; and
adjusting the anti-vibration actuator;
wherein the step of adjusting includes steps of:
driving the movable portion of the anti-vibration actuator in a first direction in the locked state and measuring the range over which the movable portion is able to move in the first direction;
driving the movable portion of the anti-vibration actuator in a second direction, different from the first direction, in the locked state, and measuring the range over which the movable portion is able to move in the second direction;

determining a movable portion initial position at the time of startup of image-blur prevention control by the anti-vibration actuator, within the movable range in the first direction and within the movable range in the second direction, and storing same in a memory section and wherein the step of adjusting further includes a step for moving the anti-vibration actuator movable portion to approximately the center of the movable range in the first direction after the step of driving in the first direction, the second direction being selected approximately position is determined to be approximately at the center of the movable range in the first direction and approximately at the center of the movable range in the second direction.

2. The lens unit manufacturing method according to claim 1, wherein the step of adjusting is carried out with the movable portion controlled to be able to move only translationally.

3. An anti-vibration actuator manufacturing method furnished with a locking mechanism for executing image-blur prevention control by moving an image-blur prevention lens, comprising steps of:

assembling a fixed portion, a movable portion to which the image-blur prevention lens is attached, and a movable portion locking mechanism for locking the movable portion;

placing the movable portion locking mechanism in a locked state;

driving the movable portion in a first direction in the locked state and measuring the range over which the movable portion is able to move in the first direction;

driving the movable portion in a second direction, different from the first direction, in the locked state, and measuring the range over which the movable portion is able to move in the second direction;

determining a movable portion initial position at the time of startup of image-blur prevention control by the anti-vibration actuator, within the movable range in the first direction and within the movable range in the second direction, and storing same in a memory section and moving the anti-vibration actuator movable portion to approximately the center of the movable range in the first direction after the step of driving in the first direction, the second direction being selected approximately perpendicular to the first direction, and in the step of determining, the movable portion initial position is determined to be approximately at the center of the movable range in the first direction and approximately at the center of the movable range in the second direction.

* * * * *